United States Patent [19]

Gahn

[11] Patent Number: 4,576,878
[45] Date of Patent: Mar. 18, 1986

[54] METHOD AND APPARATUS FOR REBALANCING A REDOX FLOW CELL SYSTEM

[75] Inventor: Randall F. Gahn, Columbia Station, Ohio

[73] Assignee: The United States of America as represented by the Administrator of the National Aeronautics and Space Administration, Washington, D.C.

[21] Appl. No.: 748,536

[22] Filed: Jun. 25, 1985

[51] Int. Cl.$^4$ .............................................. H01M 8/04
[52] U.S. Cl. ........................................ 429/15; 429/17; 429/19; 429/21; 429/51; 429/107; 429/109
[58] Field of Search ..................... 429/15, 17, 19, 21, 429/51, 107, 109

[56] References Cited

U.S. PATENT DOCUMENTS

| | | | |
|---|---|---|---|
| 3,996,064 | 12/1976 | Thaller | 429/21 X |
| 4,159,366 | 6/1979 | Thaller | 429/19 X |
| 4,370,392 | 1/1983 | Savinell | 429/15 |

Primary Examiner—Charles F. LeFevour
Attorney, Agent, or Firm—James A. Mackin; John R. Manning

[57] ABSTRACT

A rebalance cell is provided for a REDOX electrochemical system of the type having anode and cathode fluids which are aqueous HCl solutions with two metal species in each. The rebalance cell has a cathode compartment and a chlorine compartment separated by an ion permeable membrane. By applying an electrical potential to the rebalance cell while circulating cathode fluid through the cathode compartment and while circulating an identical fluid through the chlorine compartment, any significant imbalance of the REDOX system is prevented.

15 Claims, 2 Drawing Figures

METHOD AND APPARATUS FOR REBALANCING A REDOX FLOW CELL SYSTEM

ORIGIN OF THE INVENTION

This invention was made by an employee of the U.S. Government and may be manufactured or used by or for the government without the payment of any royalties thereon or therefor.

TECHNICAL FIELD

This invention relates to electrical energy storage devices and is directed more particularly to an electrically rechargeable reduction-oxidation (REDOX) type cell. REDOX cells utilizing anode and cathode fluids separated by an ion permeable membrane and employing REDOX couples as the electrochemical active materials are generally well-known. The electrochemical capacity of the anode and cathode fluids is a function of the amount of active material in the solution and the oxidation state of the material.

If the anode fluid and the cathode fluid contain the same number of equivalents of active material and both have the same degree of charge the REDOX system is said to be in balance. During operation of a REDOX system, electrochemical imbalance can gradually occur if reactions other than the desired electrochemical REDOX reactions are present. For example, if a system when new had a coulombic capacity of 100 ampere hours and after a certain period of operation had a capacity of only 80 ampere hours, it would be clear that an imbalance between the anode and cathode fluids had occurred provided none of the active material passed through the membrane. An imbalance is defined as a different state-of-charge in the anode and cathode fluids.

For a REDOX system using a chromous/chromic couple as the anode fluid and the ferrous/ferric couple as the cathode fluid, a balanced system has the same number of equivalents of chromous chloride in the anode fluid as there are equivalents of ferric chloride in the cathode fluid. The anode fluid is an aqueous solution of hydrochloric acid and chromium chloride while the cathode fluid is an aqueous solution of hydrochloric acid and iron chloride.

Any imbalance which occurs in a REDOX cell may be caused by a number of reactions. These reactions include air oxidation of the cathode fluid, air oxidation of the anode fluid, co-evolution of $H_2$ during recharge and chemical reduction of water by chromous ions. A more detailed explanation of these reactions is given in U.S. Pat. No. 4,159,366 which is incorporated herein by reference.

BACKGROUND ART

U.S. Pat. No. 3,996,064 to Thaller discloses a rechargeable REDOX flow cell utilizing anode and cathode fluids. The cell utilizes a semi-permeable anion membrane and primarily discusses the iron-chromium couple although other metal ions species are indicated as being useful.

U.S. Pat. No. 4,159,366 to Thaller discloses an iron-hydrogen electrochemical rebalance cell for maintaining electrochemical balance between the reactants of an iron-chromium REDOX system.

U.S. Pat. No. 4,370,392 to Savinell and Liu discloses a chromium-chlorine REDOX energy storage system. This is a rechargeable storage device in which iron could not be used as an anode material since chlorine and iron are both cathode materials.

U.S. Pat. No. 3,540,933 to Boeke describes a liquid reactant fuel cell in which the reactants are separated by a porous membrane between the anode and cathode compartments. The reactants are acidic solutions containing a combination of at least two metal ion complexes. Reactants are chemically charged by reducing one-half of the solution with methanol and oxidizing the other half with hydrogen peroxide or air. The charged reactants are then electrochemically discharged in the fuel cell.

DISCLOSURE OF THE INVENTION

In accordance with the invention, a rebalance cell is provided for a REDOX system of the type wherein prior to being charged the anode and cathode fluids are identical solutions. Each solution contains both of the metal ion complexes of the REDOX couple to be used in an aqueous HCl solution. The rebalance cell has a cathode fluid compartment and a chlorine compartment. The cathode fluid of the REDOX cell also passes through the cathode compartment of the rebalance cell while a reactant fluid containing oxidized species of both metal ions used in the REDOX cell in an aqueous HCl solution pass through the chlorine chamber of the rebalance cell.

By applying an electric potential to the rebalance cell, the active metal ion in the cathode fluid is reduced while chloride ions of the chlorine chamber of the rebalance cell becomes oxidized. Reproducible and controllable performance is obtained with the rebalance cell of the invention. Further, hydrogen generation in the REDOX cell is minimized by eliminating contamination caused by any platinum or other catalyst having low $H_2$ over voltages.

DESCRIPTION OF A PREFERRED EMBODIMENT

Figure 1:
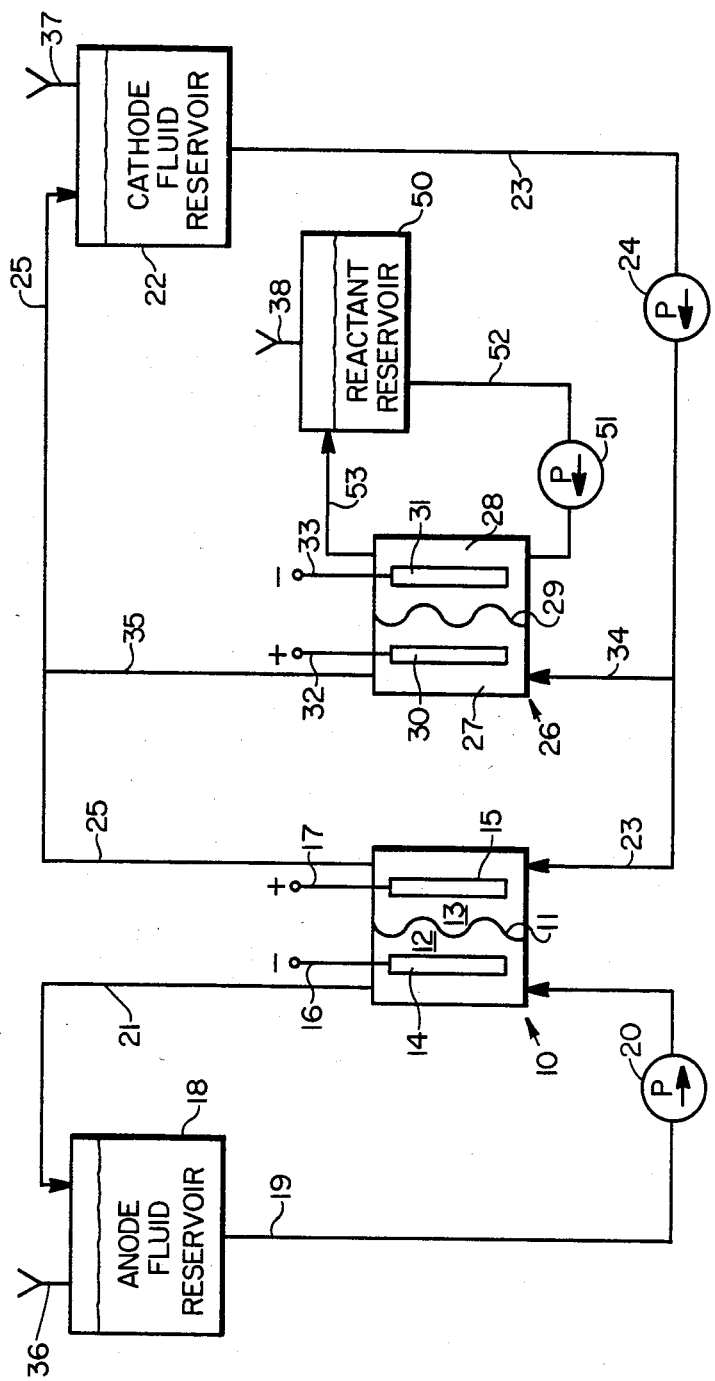
FIG. 1 is a schematic diagram of a REDOX system embodying the rebalance cell of the invention.

Referring now to FIG. 1 there is shown a REDOX cell 10 divided by an ion exchange membrane 11 into an anode compartment 12 and a cathode compartment 13. Inert electrodes such as carbon felt electrodes 14 and 15 are disposed in anode and cathode chambers 12 and 13, respectively, and are connected to respective power terminals 16 and 17.

Anode fluid for the anode fluid compartment 12 is obtained from an anode fluid reservoir 18. The fluid flows through a supply line 19 and is directed by a pump 20 through the anode compartment 12 of the REDOX cell 10 and is returned to the anode fluid reservoir 18 through a return line 21.

Similarly, cathode fluid from a reservoir 22 flows through a supply line 23 and is directed by a pump 24 through the cathode compartment 13 of the REDOX cell 10, returning to the reservoir 22 by means of a return line 25. The apparatus described thus far is similar to the REDOX system disclosed in U.S. Pat. No. 3,996,064 which is incorporated herein by reference.

As disclosed in that patent, after a certain length of time of operation of the REDOX cell, an imbalance wherein the anode and cathode fluids have a different state of charge will occur. This effectively reduces the coulombic capacity of the cell. To substantially prevent the occurrence of imbalance in the REDOX 10 a rebalance cell is identified by the numeral 26 in FIG. 1 as provided.

The rebalance cell 26 is provided with a cathode fluid compartment 27 and a chlorine compartment 28, the compartments being separated by an ion exchange membrane 29. An inert electrode such as carbon felt electrode 30 is disposed in the cathode fluid compartment 27 and is connected to an input terminal 32. Similarly, an inert electrode such as carbon felt electrode 31 is disposed in the chlorine compartment 28 and is connected to an input terminal 33. The membrane 29 is cation selective membrane which reduces iron fouling.

Cathode fluid for compartment 27 is obtained from the same cathode fluid reservoir 22 which provides cathode fluid to compartment 13 of the REDOX cell 10. The cathode fluid for the rebalance cell 26 flows from the input line 23 through a rebalancing cell supply line 34, then through the cathode chamber 27 and finally through a return line 35 to add to the cathode fluid returning to reservoir 22 through the return line 25.

A reactant fluid for chlorine compartment 28 of the rebalance cell 26 is supplied from a reservoir 50 by means of a pump 51 in a delivery line 52. The fluid passes through chamber 28 and returns to reservoir 50 through a return line 53.

During operation of the REDOX cell and the rebalance cell gases will be generated at various points in the system. To relieve any gas pressure which could cause damage to the system or injury to operating personnel, vents 36, 37, and 38 are provided for the respective resevoirs 18, 22 and 50.

In a preferred embodiment of the REDOX system shown in FIG. 1, the anode fluid of reservoir 18, the cathode fluid of reservoir 22 and the reactant fluid of reservoir 50 each contain both species of the metal ions to be used for the REDOX couple. In the most preferred embodiment, the ion species are iron chloride and chromium chloride in aqueous HCl solutions. In all solutions the concentration is 1 molar $Fe^{+3}$, 1 molar $Cr^{+3H}$ and 3 normal HCl.

When a difference of potential is applied to the terminals 16 and 17 of the REDOX cell 10, the chromium in the anode fluid achieves a reduced state while the iron in the cathode fluid becomes oxidized. Operation of the rebalance cell 26 is carried out by applying the potential shown between terminals 32 and 33 either continuously or as needed. This causes ferric ions in chamber 27 to become reduced to ferrous ions. At the same time, the chlorine ions in the rebalance cell fluid supplied by reservoir 50 become oxidized to chlorine gas.

While the REDOX system of FIG. 1 has been described with respect to an iron-chromium couple other ionic species may be used. For example, U.S. Pat. No. 3,996,064 to Thaller discloses a number of metal chlorides which may be dissolved in aqueous HCl to provide anode and cathode fluids. The patent also discusses considerations in selecting the ion permeable membranes such as 11 and 29 of the REDOX cell 10 and the rebalance cell 26, respectively.

In an iron-chromium REDOX system, imbalance occurs because of hydrogen evolution on the anode side and also because of chromous and ferrous ion oxidation caused by oxygen intrusion into the anode and cathode fluids due to system leaks or material permeabilty. These undesirable reactions cause the iron reactant to become charged before the chromium reactant. Theoretically, the degree of imbalance could continue until the iron reactant is in the fully charged state ($Fe^{+3}$) while the chromium reactant is completely discharged ($Cr^{+3}$). The effective coulombic capacity could become zero although there has been no loss of either reactant.

In the rebalance cell 26, the ferrous ions produced in the cathode chamber 27 are returned through lines 35 and 25 to the cathode fluid reservoir 22. At the same time, the chlorine gas produced in the anode chamber 28 is carried by the circulating rebalancing cell fluid to the reactant reservoir 50 and vented through the vent 38.

Preferably, any chlorine and hydrogen gases vented from the REDOX system would be combined by any of the well known methods used in the prior art and returned to the system. If the hydrogen and chlorine are vented from the system, then HCl must be added to the system as needed. HCl must also be added to the system when rebalancing is necessary due to air intrusion since hydrogen ions are consumed by the chromous oxidation reaction.

Figure 2:
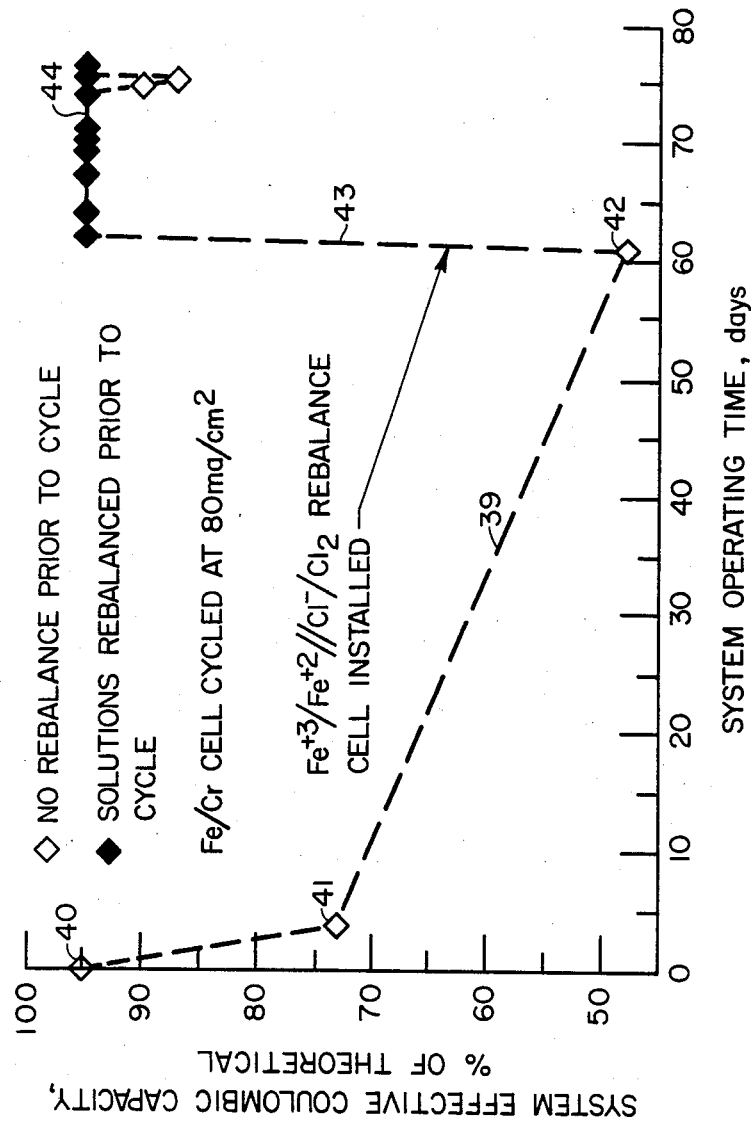
FIG. 2 is a graph illustrating the reduction of coulombic capacity due to imbalance of the REDOX fluids.

Referring now to FIG. 2, there is shown a graph of the coulombic capacity of an iron-chromium REDOX cell with and without incorporation of a rebalance cell. As shown by the curve 39, the coulombic capacity dropped from its initial value of about 95% at point 40 to about 73% at point 41 and declined to less than 50% after about 61 days. At point 42 the rebalance cell 26 was installed and the system was rebalanced causing the coulombic capacity to increase as indicated by the vertical line 43. After that the coulombic capacity stayed quite constant as indicated by the line 44. The addition of the rebalanced cell 26 to the REDOX system shown in FIG. 1 has not affected the performance of the iron-chromium REDOX cell. Membrane resistance, electrode reversibility and hydrogen evolution rates have remained unchanged during the period the iron-chlorine rebalance cell was evaluated.

From the foregoing description, it will be seen that the instant invention provides for a REDOX system a rebalance cell which includes no platinum or other materials having low $H_2$ overvoltage and which provides reproducible and controllable performance.

It will be understood that changes and modifications may be made to the above-described REDOX rebalance cell and system without departing from the spirit and scope of the invention as set forth in the claims appended hereto.

I claim:

1. In a REDOX system including a REDOX cell having an anode chamber and a cathode chamber separated by an ion exchange membrane with an inert electrode in each chamber and anode and cathode fluids each of which includes the same two species of metal chlorides in aqueous HCl, the active metal ions in each fluid being determined by the charging voltage applied between the electrodes of the REDOX cell, the improvement comprising:

a rebalance cell having a cathode chamber and a chlorine reactant chamber separated by an ion permeable membrane with an inert electrode in each chamber; means for directing the cathode fluid of the REDOX cell through the cathode chamber of the rebalance cell;

a supply of reactant fluid comprised of said two species of metal chlorides in aqueous HCl;

means for circulating said reactant fluid through said reactant chamber while said electrode in said reactant chamber is negative with respect to said electrode in the cathode chamber whereby the active metal ions in the cathode chamber are reduced while chlorine ions in the reactant chamber are oxidized to chlorine gas.

2. The system of claim 1 wherein the two metal species in the anode, cathode and reactant fluids are iron chloride and chromium chloride.

3. The system of claim 2 wherein said anode, cathode and reactant fluids are 3 N aqueous HCl solutions.

4. The system of claim 3 wherein the iron ions and the chromium ions are each present in a 1 molar concentration.

5. The system of claim 1 wherein the electrodes are bi-carbon felt material.

6. The system of claim 1 wherein the electrode in the chlorine chamber of the rebalance cell is in direct contact with the ion permeable membrane.

7. The system of claim 1 wherein said anode, cathode and reactant fluids contain bismuth.

8. The system of claim 1 wherein said ion permeable membrane of the rebalance cell is cation permeable.

9. A method of rebalancing the charge in the anode and cathode fluids of a REDOX cell of the type having the same two metal ion species in each of said fluids, the fluids being aqueous HCl, comprising the steps of:

providing a rebalance cell separated into a cathode chamber and a chlorine chamber by an ion permeable membrane;

passing said cathode fluid through said cathode chamber;

providing a supply of aqueous HCl reactant fluid containing the same metal ion species as the anode and cathod fluids; and passing said reactant fluid through said chlorine chamber while supplying electrons thereto and simultaneously removing electrons from said cathode fluid whereby active metal ions are reduced in the cathode chamber and chlorine ions are oxidized to chlorine gas in the chlorine chamber.

10. The method of claim 9 wherein one of said two metal ion species in the cathode fluid is iron.

11. The method of claim 9 wherein the anode, cathode and reactant fluids contain trace amounts of bismuth or bismuth and lead.

12. The method of claim 9 wherein said ion permeable membrane is cation permeable.

13. The method of claim 9 wherein said two metal ion species are iron and chromium.

14. The method of claim 13 wherein the anode, cathode and reactant fluids are 3 normal HCl.

15. The method of claim 14 wherein said iron and chromium species are present in a 1 molar concentration of each.

* * * * *